US007861268B2

United States Patent
Kwak

(10) Patent No.: US 7,861,268 B2
(45) Date of Patent: Dec. 28, 2010

(54) METHOD OF PROCESSING BROADCAST SIGNAL IN TELEVISION RECEIVER AND TELEVISION RECEIVER USING THE SAME

(75) Inventor: Dong Youp Kwak, Busan (KR)

(73) Assignee: LG Electronics Inc., Seoul (KR)

( * ) Notice: Subject to any disclaimer, the term of this patent is extended or adjusted under 35 U.S.C. 154(b) by 599 days.

(21) Appl. No.: 11/430,886

(22) Filed: May 10, 2006

(65) Prior Publication Data

US 2007/0016919 A1 Jan. 18, 2007

(30) Foreign Application Priority Data

Jul. 4, 2005 (KR) ............ 10-2005-0059699

(51) Int. Cl.
*G06F 3/00* (2006.01)
(52) U.S. Cl. ............................................. 725/47
(58) Field of Classification Search .............. 725/28, 725/34
See application file for complete search history.

(56) References Cited

U.S. PATENT DOCUMENTS

| 5,973,683 | A * | 10/1999 | Cragun et al. ............ 715/719 |
| 6,408,128 | B1 * | 6/2002 | Abecassis ............... 386/68 |
| 6,865,747 | B1 * | 3/2005 | Mercier .................. 725/94 |
| 7,200,852 | B1 * | 4/2007 | Block .................... 725/28 |
| 7,239,709 | B1 | 7/2007 | Yamada et al. |
| 2002/0087999 | A1 * | 7/2002 | Kashima ............... 725/100 |
| 2002/0144270 | A1 * | 10/2002 | Mizushiro et al. ......... 725/55 |
| 2002/0174430 | A1 * | 11/2002 | Ellis et al. .............. 725/46 |
| 2003/0014750 | A1 * | 1/2003 | Kamen ................. 725/25 |
| 2003/0194211 | A1 | 10/2003 | Abecassis |
| 2008/0320523 | A1 * | 12/2008 | Morris et al. ............ 725/47 |

FOREIGN PATENT DOCUMENTS

| CN | 1262770 A | 8/2000 |
| CN | 1380653 A | 11/2002 |
| CN | 1489386 A | 4/2004 |
| CN | 1615644 A | 5/2005 |
| EP | 1 249 835 A2 | 10/2002 |
| FR | 2 828 975 A1 | 2/2003 |
| JP | 2001-103444 A | 4/2001 |
| JP | 2004-032542 A | 1/2004 |

* cited by examiner

*Primary Examiner*—Brian T Pendleton
*Assistant Examiner*—Cai Chen
(74) *Attorney, Agent, or Firm*—Birch, Stewart, Kolasch & Birch, LLP

(57) ABSTRACT

A method of processing a broadcast signal in a television receiver and a television receiver using the same are provided, by which contiguous packets of a transport stream can be selectively blocked in reproduction. The television receiver includes a decoder for decoding a broadcast signal constructed as a transport stream of at least one packet; a flag setting unit for setting in response to a control signal at least one blocking flag identifying at least one contiguous section of the transport stream, the at least one blocking flag being located in at least one unused field of the decoded transport stream; a controller for outputting the control signal to the flag setting unit according to a user selection signal input; and a storage medium for storing the decoded transport stream in which the at least one blocking flag is set.

21 Claims, 6 Drawing Sheets

FIG. 4A

| MENU |
|---|
| Lock setting of blocked viewing?   ON ▼ / OFF |
| Input password: ☐☐☐☐ |

FIG. 4B

| MENU |
|---|
| View original stream?   YES ▼ / NO |
| Input password: ☐☐☐☐ |

METHOD OF PROCESSING BROADCAST SIGNAL IN TELEVISION RECEIVER AND TELEVISION RECEIVER USING THE SAME

This application claims the benefit of Korean Patent Application No. 10-2005-0059699, filed on Jul. 4, 2005, which is hereby incorporated by reference as if fully set forth herein.

BACKGROUND OF THE INVENTION

1. Field of the Invention

The present invention relates to television receivers, and more particularly, to a method of processing a broadcast signal in a television receiver and a television receiver using the same.

2. Discussion of the Related Art

A television receiver may incorporate, internally or externally, a digital video recorder known as a personal video recorder or PVR, which enables high-definition (e.g., DVD quality) recording and reproduction of broadcast signals using a data storage medium such as a hard disc. A personal video recorder is further provided with a central processing unit for executing reproduction functions, an operating system, a memory (ROM) integrated with a reproduction software chip, and a large-scale hard disc, and by connecting to a telephone line, may receive on demand an updated broadcast schedule to enable pre-programmed recording. Accordingly, using a function similar to that of a computer hard disc, numerous broadcast programs may be consecutively or simultaneously recorded for playback as desired by a user, at any time and in any sequence, regardless of a broadcaster's scheduling. Thus, a personal video recorder is similar to a conventional videocassette recorder, in that a program may be transferred from a broadcasting station to be stored for later playback, but provides greater flexibility and user convenience since recording is performed without videotape, so that an instance of reproduction may be executed with high selectivity, such as by skipping portions (e.g., commercials) of a program or a stream of programs.

Meanwhile, state-of-the-art digital television receivers may have data storage capacities of as much as tens to hundreds of gigabytes for storing tens of broadcast programs, depending on their degree of definition. Along with this considerable storage capability comes the desire to control access to stored programs. For example, a television receiver in the home may store programs unsuitable for viewing by children. Therefore, there is a need for a method of storing a great number of programs, having a wide variety of content and enabling playback as desired by the user while selectively restricting access to the stored content.

SUMMARY OF THE INVENTION

Accordingly, the present invention is directed to a broadcast signal processing method and a television receiver using the same that substantially obviates one or more problems due to limitations and disadvantages of the related art.

An object of the present invention is to provide a method of processing a broadcast signal in a television receiver and a television receiver using the same, by which a transport stream can be selectively and partially blocked during its reproduction.

Another object of the present invention is to provide a method of processing a broadcast signal in a television receiver and a television receiver using the same, which facilitates a reproduction of a stored transport stream that is to be only partially reproduced.

Another object of the present invention is to provide a method of processing a broadcast signal and a television receiver using the same, which facilitates a user interface.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a television receiver comprising a decoder for decoding a broadcast signal constructed as a transport stream of at least one packet; a flag setting unit for setting in response to a control signal at least one blocking flag identifying at least one contiguous section of the transport stream, the at least one blocking flag being located in at least one unused field of the decoded transport stream; a controller for outputting the control signal to the flag setting unit according to a user selection signal input; and a storage medium for storing the decoded transport stream in which the at least one blocking flag is set.

According to another aspect of the present invention, there is provided a broadcast signal processing method comprising setting, according to a user selection, at least one blocking flag identifying at least one contiguous section of a transport stream constructed using at least one packet, the at least one blocking flag being located in at least one unused field of the transport stream; storing in a storage medium the transport stream in which the at least one blocking flag is set; and selectively reproducing the stored transport stream according to information of the at least one blocking flag.

According to another aspect of the present invention, there is provided a broadcast signal processing method comprising setting, according to a user selection, at least one blocking flag identifying at least one contiguous section of a transport stream constructed using at least one packet, the at least one blocking flag being located in at least one unused field of the transport stream; storing in a storage medium the transport stream in which the at least one blocking flag is set; selectively setting a lock function for managing reproduction options of a full reproduction of the transport stream and a restricted reproduction of the transport stream; storing in the storage medium a password for releasing the set lock function; selecting one of the reproduction options; and selectively reproducing the stored transport stream according to information of the at least one blocking flag and the selective setting of the lock function.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B are diagrams respectively illustrating the setting and release of a lock function according to the method of the present invention;

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

Figure 1:
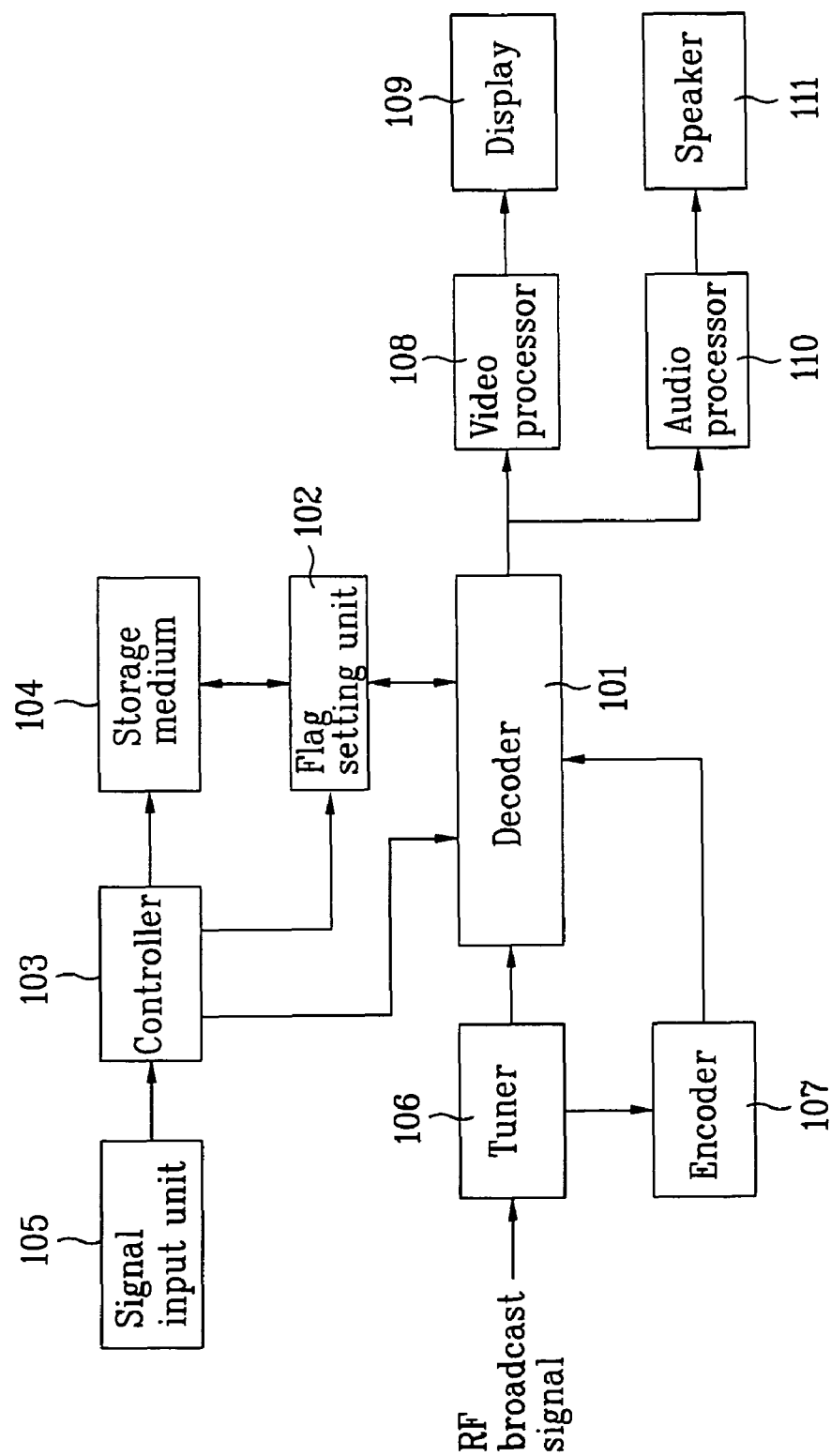
FIG. 1 is a block diagram of a television receiver according to the present invention.

FIG. 1 illustrates a television receiver according to the present invention, including only the essential elements for describing a function of selectively blocking, i.e., proscribing, an unauthorized reproduction of a specific portion or portions of a stored broadcast signal or transport stream that has been previously recorded. Here, it should be appreciated that various elements of the television receiver necessary for receiving and displaying broadcast signals have been omitted but are unnecessary for explaining the present invention. There is no special limitation put on the television receiver of the present invention, which may also be imparted with general television receiver functions and may be a plasma display panel type, a liquid-crystal display type, or a general flat-panel type.

Referring to FIG. 1, a television receiver according to the present invention includes a decoder 101 for decoding a broadcast signal constructed as a transport stream of at least one packet; a flag setting unit 102 for setting at least one blocking flag identifying at least one portion of the transport stream to be blocked during reproduction, the blocking flag being located in at least one unused field of the decoded transport stream; a controller 103 for outputting a control signal to the flag setting unit according to a user selection signal input; and a storage medium 104 for storing the decoded transport stream in which the at least one blocking flag is set and for storing a password in association with the stored transport stream. The user selection signal input is provided from a signal input unit 105 for generating a command signal to set the at least one blocking flag and for inputting a password for setting or releasing a lock function for managing reproduction options, including full reproduction and restricted reproduction. Thus, the generated command signal and the input password are determined by a user manipulating the signal input unit 105.

As described above, the television receiver according to the present invention is capable of selectively reproducing a transport stream stored in the storage medium 104, which may be a hard disc provided internally or externally to the main unit (not shown) of the television receiver, for storing data streams corresponding to video data, audio data, and additional information associated with the video and audio data. For recording functions, the television receiver according to the present invention further includes a tuner 106 for receiving a specific (i.e., tuned) radio frequency (RF) broadcast signal, which may be either an analog broadcast signal or a digital broadcast signal in a format of the transport stream constructed using the at least one packet, and an encoder 107 for converting an analog broadcast signal output from the tuner into a signal of a transport stream format for input to the decoder 101. That is, the tuner 106 outputs a received signal to the decoder 101 or to the encoder 107 depending on the type of signal received. If a received broadcast signal is a digital signal, the decoder 104 decodes the received broadcast signal, but if a received broadcast signal is an analog signal, the encoder 107 converts the received broadcast signal into a digital signal for decoding and storage. Besides performing an overall control of the television receiver, the controller 103 in particular controls the storage of transport data streams output from the decoder 101 and the outputting of previously stored data from the storage medium 104.

Meanwhile, the decoder 101 includes a system decoder (not shown), a video decoder (not shown) and an audio decoder (not shown). The decoded broadcast signal is processed by a video processor 108 for output by a display 109 and by an audio processor 110 for output by a speaker 111.

Figure 2:
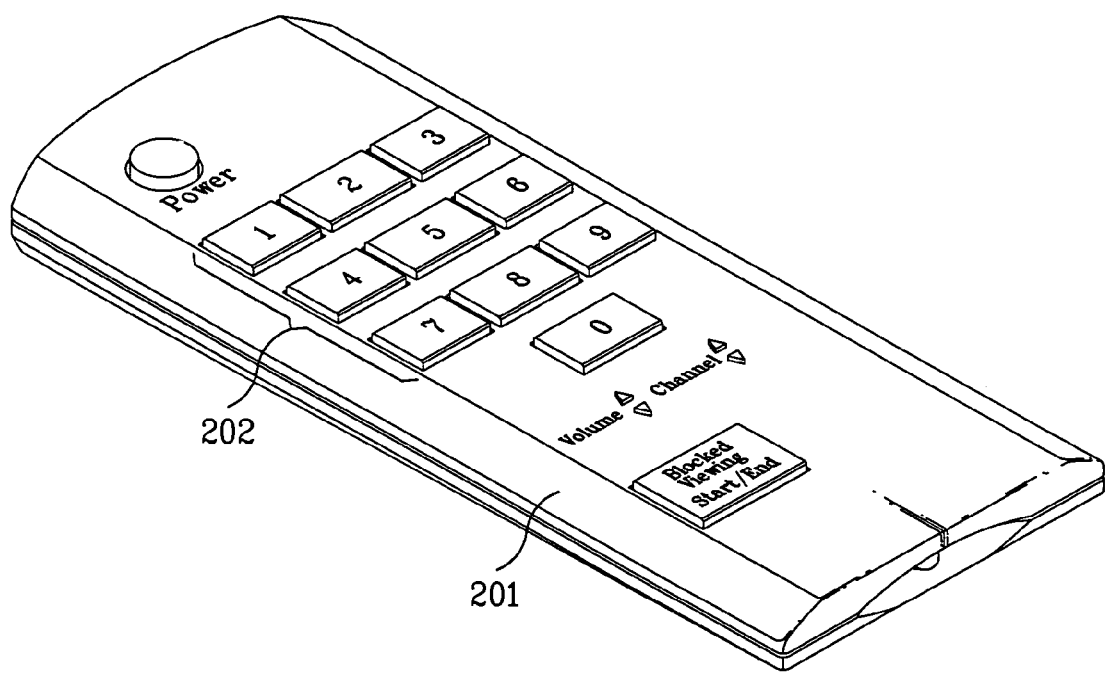
FIG. 2 is a perspective view of an exemplary signal input unit of FIG. 1.

FIG. 2 shows a remote controller as one example of the signal input unit 107, which generates command signals according to user selections for input to the controller 103 and includes a button 201 for setting the at least one blocking flag and at least one button 202 for inputting a password or PIN number to control the lock function, which is a selective activation/deactivation of a blocking flag. As an alternative, a keypad having the above buttons may be provided to the main unit of the television receiver. A start point of the at least one contiguous section of the transport stream to be blocked during reproduction is determined by a first operation of the blocking flag setting button 201, and an end point of the at least one contiguous section of the transport stream to be blocked during reproduction is determined by a second operation of the blocking flag setting button. That is, a section's start point may be set by pressing the button 201 once, and a section's end point may be set by pressing the same button again, thereby identifying a portion of a stored broadcast signal. The above functions of the blocking flag setting button 201 may be realized by more than one button (not shown), for example, a start set button and an end set button, or by one or more of the buttons provided in a general remote controller or local keypad.

Figure 3:
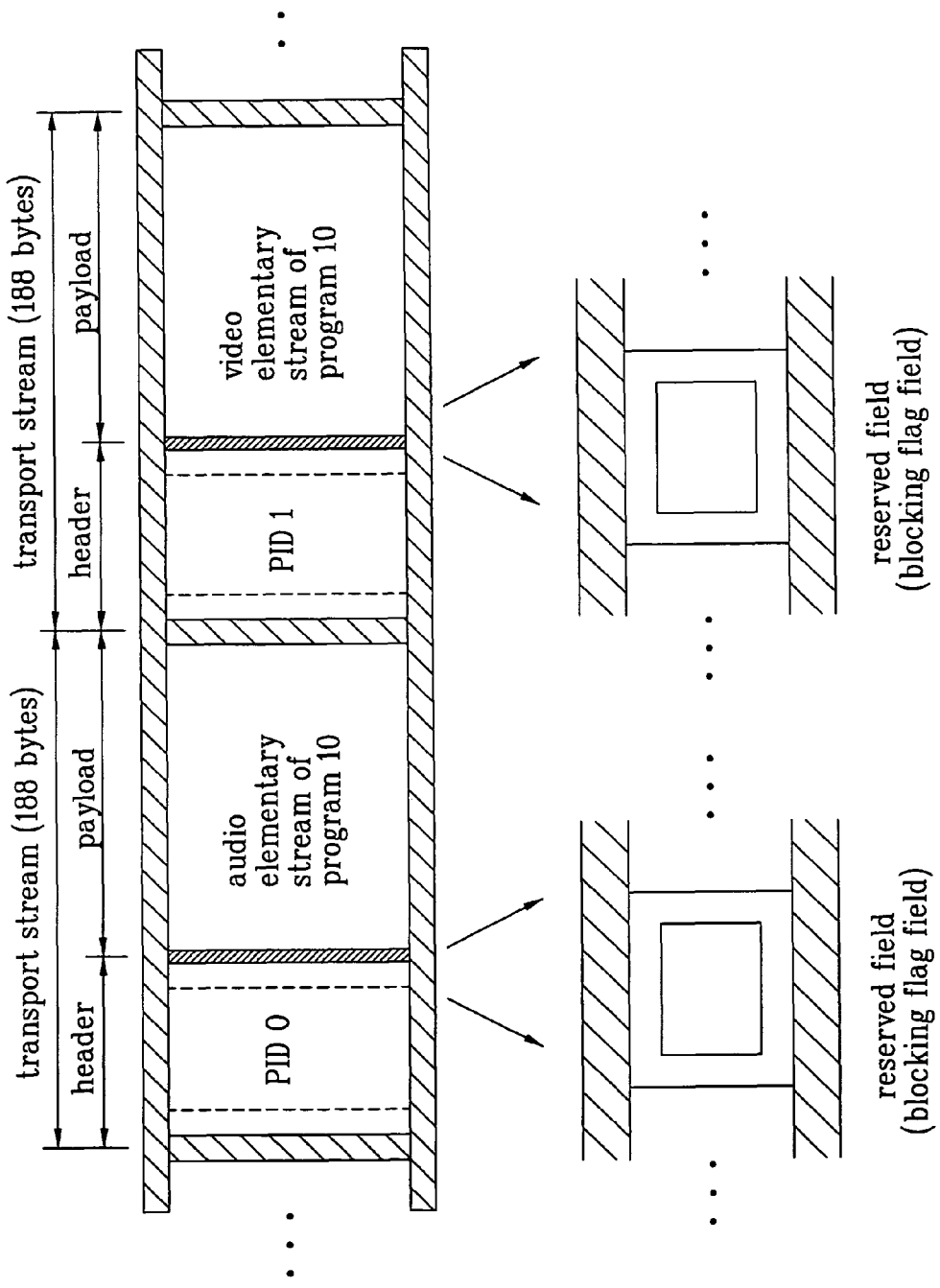
FIG. 3 is a diagram of a sample transport stream including two packets.

FIG. 3 diagrams a sample transport stream to be stored (recorded) in the storage medium 104, in which two packets having packet identifiers "0" (PID 0) and "1" (PID 1) are shown. Each packet of an illustrative "program 10" includes a header and a payload. At least one unused part of the stream may correspond to at least one unused field among reserved fields of the header. The blocking flag set by the button 201 of the signal input unit 105 is a signal of at least one bit that identifies data of the payload corresponding to the header in which the blocking flag is included as data that, according to the status (i.e., locked or released) of the locking function, may or may not be reproduced. To cause a reproduction of the data of a payload, a corresponding blocking flag is set to a first predetermined digital value (e.g., a "0" or a "1"); conversely, to prevent a reproduction of the data of a payload, the corresponding blocking flag is set to a second predetermined digital value (e.g., "1" or a "0").

Alternatively, the at least one unused part may correspond to at least one unused field among reserved fields of the payload. That is, the blocking flag may be located in an unused field of the payload rather than in a reserved field of the header.

According to the present invention, the flag setting unit 102 sets, in response to a control signal received from the controller 103, a blocking flag for each portion of a broadcast signal stored in the storage medium 104 that is to be identified as restricted content, so that upon an instance of playback the identified portions may be selectively blocked from being reproduced or may be reproduced in full as recorded, that is, the same as an original signal. Rather than restricted, other portions of the broadcast signal may be optionally skipped by the viewer for an instance of reproduction. The blocking flags of the present invention pertain in particular to restricted content that is to be blocked unless a password is correctly entered.

In the operation of the television receiver shown in FIG. 1, which receives a transport stream constructed using at least one packet, at least one blocking flag identifying at least one portion of the transport stream to be blocked during reproduction is set by a user selection, the set blocking flag being located in at least one unused field within the transport stream. The transport stream, in which the at least one blocking flag is set, is stored for future reproduction attempts by one or more users performing one or more reproduction operations. Thereafter, in response to a user request to reproduce the stored transport stream, the controller 103 determines based on a user input from the signal input unit 105 whether the stored transport stream is to be reproduced in full or in part, namely, by blocking the at least one portion of the stored transport stream as identified by the information of the at least one blocking flag.

According to the method of processing a broadcast signal in a television receiver, at least one blocking flag corresponding to at least one portion of a transport stream constructed using at least one packet is set according to a user selection. The set blocking flag is located within at least one unused field of each packet of the at least one portion, so that the set blocking flag identifies a contiguous section of the transport stream by being included in the at least one unused field. Accordingly, the user selection to set the blocking flag determines the portion of the transport stream to be selectively blocked. The transport stream, in which the at least one blocking flag is thus set, is stored in the storage medium 104 enabling a future reproduction attempt.

A lock function is set by a primary user input, to restrict reproduction of the stored transport stream in the event of a future reproduction attempt, thereby selectively preventing a full reproduction of the stored transport stream. The primary user input is for setting the lock function and is performed in conjunction with the input of a password for enabling a release of the lock function. The password is also stored in the storage medium 104.

Upon attempting to reproduce the stored transport stream, a restricted reproduction or a full reproduction of the stored transport stream is selectively performed according to a secondary user input via the signal input unit 105. The secondary user input corresponds to the input of a password at the time of an attempt to reproduce a stored transport stream, and the selective performance of the restricted or full reproduction is determined by a user input to the controller 103 and is based on a comparison between the primary and secondary user inputs. That is, in the event that performance of a restricted reproduction is selected by the user input, the stored transport stream is reproduced in part according to information of the at least one blocking flag, that is, by blocking the portion of the stored transport stream corresponding to the setting of at least one blocking flag. Conversely, in the event that performance of a full reproduction is selected by the user input, the stored transport stream is reproduced in full or as a restricted reproduction in which one or more portions are blocked according to the presence of a release of the lock function, namely, a correct password input by the user attempting to perform the full reproduction. In the event that the user input has selected a full reproduction and there is no correct password input, the reproduction process is terminated. In other words, according to the presence (or non-presence) of a release of the lock function as determined by comparing the password inputs, either the stored transport stream is entirely reproduced or the reproduction process is terminated.

On the other hand, in the event that the user input has selected a full reproduction and a correct password input is determined by the comparison operation, the lock function is released and the stored transport stream is entirely reproduced as an original signal. In other words, if the password is correctly input by a user selecting a performance of full reproduction, the stored transport stream is entirely reproduced without regard to the setting of any blocking flags. Here, it should be appreciated that one password may be assigned for the release of one blocking flag, whereby each of a plurality of passwords may be stored in the storage medium 104 according to one or more stored transport streams, each having at least one blocking flag set in at least one unused portion of the at least one packet constructing the corresponding transport stream. To do so, start and end points of each blocking flag are set accordingly.

In the case of the received RF broadcast signal being a digital broadcast signal, a transport stream constructed using at least one packet is input directly to the decoder 101 via the tuner 106. If, however, the received RF broadcast signal is an analog broadcast signal, the analog broadcast signal as received by the tuner 106 is first converted to a digital signal, and the digital signal is then input to the decoder 101 in a format of the transport data stream for an operation according to the present invention. The format of the received or stored transport data stream comprises video and audio components, which are combined according to packets. Thus, the decoder 101 independently decodes the video and audio components of the transport stream, so that a decoded video signal is provided to the video processor 108 and a decoded audio signal is provided to the audio processor 110.

In setting a blocking function for a data stream using unused fields within the transport data stream, the transport stream is received from a broadcasting station and provided to the decoder 101 (or encoder 107) via the tuner 106 or a transport stream stored in the storage medium 104 may be provided directly to the decoder. Thus, a user may view a broadcast signal in real time while the broadcast signal is being stored and while the blocking flags are being set, or the user may view a stored broadcast signal while the blocking flags are being set. In doing so, the user determines the portion or portion to be blocked during a subsequent instance of reproduction, by inputting to the controller 103 one or more blocking flags using the blocking flag setting button 201. If the blocking flag setting button 201 is pressed once during an instance of viewing as above, the controller 103 recognizes an initiation (start point) of a section to be blocked and begins to set, using a prescribed descriptor, a blocking flag within a header of a corresponding packet or packets. In the course of continued viewing, if the user determines that the portion on the viewed content to be blocked has ended, the user presses the blocking flag setting button 201 once again, in which case the controller 103 recognizes a termination (end point) of the section to be blocked and terminates the setting of blocking flags.

That is, once a first command signal for blocking is input via the signal input unit 105, the controller 103 sets blocking flags in unused fields of a header (or payload) of each packet of the transport stream in correspondence with the section to be selectively blocked during reproduction. These blocking flags are set within the packets occurring between start and end points of the corresponding section. The blocking flag information determines whether data loaded in a payload associated of each of the flagged packets, i.e., between the start and end points of the section to be blocked, is to be reproduced or simply ignored.

In more detail, the MPEG 2 standard defines fields of a transport stream that are not substantially used, known as reserved fields, which exist in the payload as well as the header. The present invention uses such fields to place the blocking flags, which are comprised of at least one bit. Each blocking flag possesses information to determine whether data of a payload corresponding to a header to which the corresponding flag belongs will be reproduced or whether the payload data is being identified as data to be blocked. If, for instance, the blocking flag is set to "0" in a specific reserved field of the header of a packet, the controller 103 normally reproduces the data of the payload corresponding to the header, such that if the blocking flag is set to another (differing) value, e.g., "1," the payload data will be identified as data to be blocked and may not be reproduced. Therefore, if a signal for setting a blocking flag is input, the controller 103 controls the transport stream being input to the decoder 101 by outputting to the flag setting unit 102 a control signal for setting one bit of a flag (e.g., a logic "1" signifying blocked data reproduction) in reserved fields of headers of the transport stream, starting from a packet corresponding to a moment that a blocking flag start signal is input. Thus, a process for repeatedly setting the blocking flag to "1" is begun and continues for each packet until input of a blocking flag end signal is detected. That is, if the user input a blocking flag end signal by pressing the blocking flag setting button 201 after it is first pressed, the controller 103 controls the input of the transport stream to the decoder 101 by immediately controlling the flag setting unit 102 to set one bit of a flag (e.g., a logic "0" signifying normal data reproduction) in reserved fields of headers of the transport stream, starting from a packet corresponding to a moment that a blocking flag end signal is input. Here, the blocking flag start signal signifies the start point of a blocked section, and the blocking flag end signal signifies the end point of a blocked section.

Accordingly, if a command signal for reproducing a broadcast signal previously stored in the storage medium 104 is input via the signal input unit 105, the decoder 101 decodes the stored transport streams as received from the storage medium, while the controller 103 recognizes information of the blocking flags contained in the transport stream. Thus, the controller 103 makes a determination for each packet according to the blocking flag information, to reproduce data loaded on a corresponding payload by packet units, such that a continuous reproduction and display results even where sections may be blocked.

FIGS. 4A and 4B respectively illustrate the setting and release of a lock function according to the method of the present invention. These are exemplary diagrams, or samples of screen images that may be displayed by the display 109 of FIG. 1, and it should be apparent that many variations in appearance and makeup are possible.

Referring to FIG. 4A, illustrating the setting of the lock function, if a user presses a menu button (not shown) on the signal input unit 105, a lock function for setting a blocked viewing function is enabled. In doing so, the displayed screen image provides an "ON" box and an "OFF" box in correspondence to the optional setting of the lock function. Once the menu mode is selected and the screen image is displayed, if the "ON" box is activated, for example, by way of a curser manipulation, a primary password input is enabled, for example, by displaying a series of, say, four empty spaces. If the "OFF" box is activated, there is no enablement of primary password input, such that a display of the four empty spaces is unnecessary. A selected password is then stored in the storage medium 104 in association with a transport stream in which blocking flags are set.

Referring to FIG. 4B, illustrating the release of the lock function, it should be appreciated that a user may wish to reproduce a transport stream, which has been stored with one or more blocking flags, either without blocking, such that an original broadcast signal is reproduced, or by allowing the blocking function to be carried out. For this, the user enters a corresponding menu mode and selects one of a "YES" box and a "NO" box. A selection of the "YES" box selects a release of the lock function, whereby a similar password input is enabled, and a selection of the "NO" box maintains a previously set lock function. If the user makes a locking release selection (i.e., "YES") and inputs the password, which constitutes a secondary password input, the controller 103 determines whether the currently input password coincides with the password stored in the storage medium 104. If a password match is determined, the controller 103 reproduces the selected transport stream in full, i.e., without blocking. Meanwhile, if the user selects the "NO" box for viewing the original stream, the controller 103 makes essentially the same determination of a failure to input a correct password reproduces the stored transport stream with the identified portion or portions blocked from viewing. In any event, if a password mismatch is determined upon entry of a secondary password input, the controller 103 reproduces the selected transport stream in part, i.e., with the blocking function in effect. If, however, the controller 105 determines that there has been no password stored for the selected transport stream, the stored transport stream is reproduced directly, regardless of whether the "YES" and the "NO" box is selected. Similarly, if the stored transport stream selected for reproduction contains no blocking flags, the stored transport stream is reproduced directly.

Figure 5:
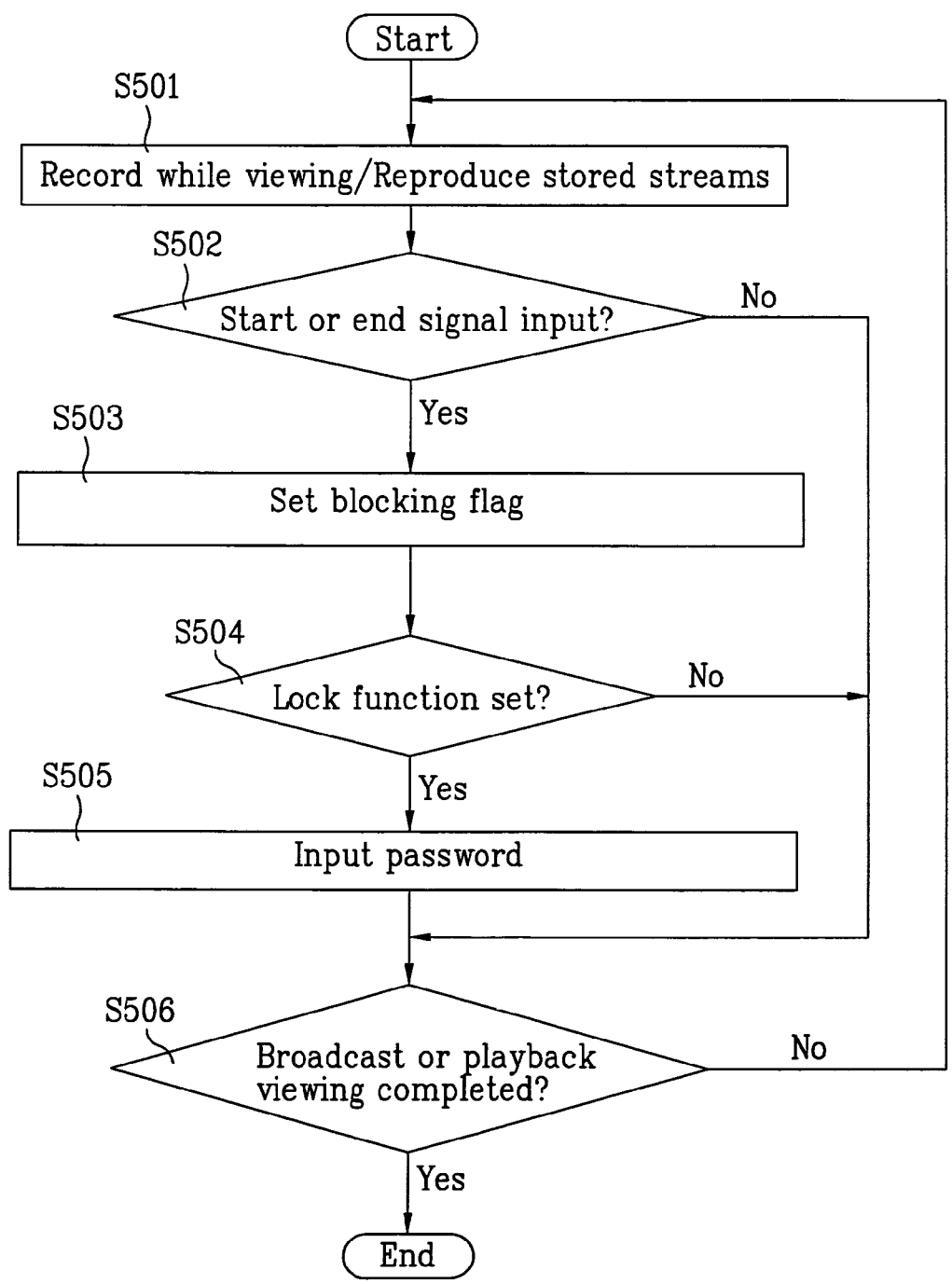
FIG. 5 is a flowchart illustrating the defining of a blocked section and the setting of a corresponding lock function according to the method of the present invention.

FIG. 5 illustrates functions of the controller 103 according to the present invention, to determine the location of a blocked section or sections by setting the corresponding flags and then activating the lock function. These functions are carried out while viewing a currently broadcast and received program or when reproducing a stored broadcast signal according to an operation of the signal input unit 105. In doing so, the controller 103 records a broadcast signal received via the tuner 106 or reproduces a transport stream stored in the storage medium 104, while displaying the received broadcast signal or stored transport stream on the display 109 (S501). Meanwhile, the controller 103 determines whether a user input, i.e., a blocking flag start signal or a blocking flag end signal, is present for setting at least one blocked section in the currently viewed or reproduced transport stream (S502). If such an input is detected, the controller 103 sets accordingly a blocking flag for identifying at least one portion of the transport stream to be blocked during reproduction (S503). By locating the blocking flag information in reserved fields of the headers of one or more packets, the controller 103 sets a "non-reproduction" indicator in the header of each packet of the section or sections to be blocked. Subsequently, the controller 106 checks whether the lock function is selected by the user (S504), whereby the controller sets the lock function and stores in the storage medium 104 a password input by the user via the input signal unit 105 (S505). If it is determined that there has been no user input corresponding to a blocking flag start signal or a blocking flag end signal, or if it is determined that no lock function is being selected, there is no corresponding password storage. This process is repeated until the controller determines that a selected transport stream has been viewed entirely (S506).

Figure 6:
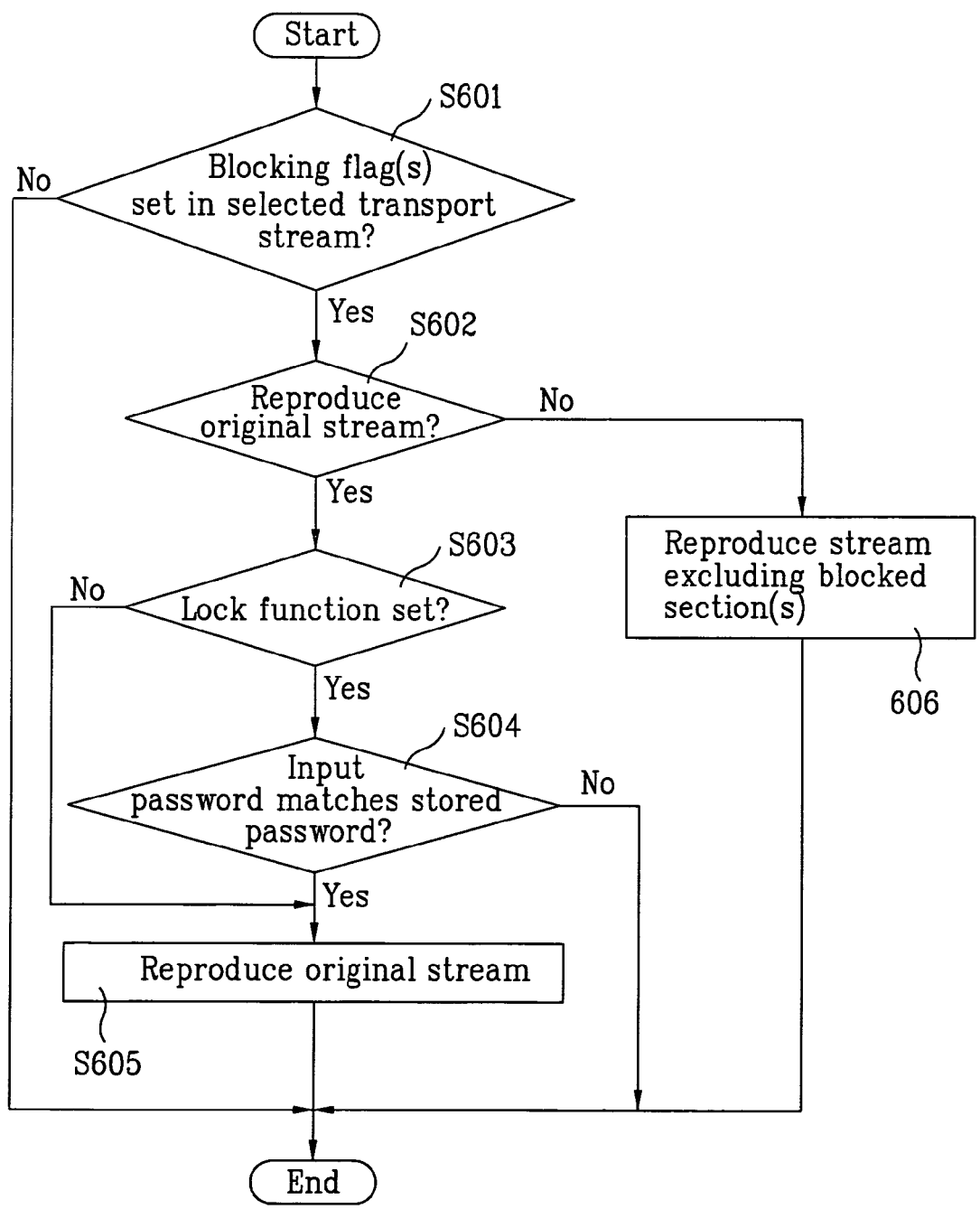
FIG. 6 is a flowchart illustrating a reproduction operation for a stored transport stream according to the method of the present invention.

FIG. 6 illustrates functions of the controller 103 according to the present invention, to execute a reproduction operation of a stored stream. These functions are carried out in the event that a stored stream is to be reproduced in full (i.e., the original stream) or in part (i.e., a selectively blocked stream). In doing so, the controller 103 first determines whether the transport stream selected for reproduction has been stored with at least one blocking flag (S601). Then, the controller 103 determines whether the user intends to reproduce the stored transport stream in full or in part (S602). If a full reproduction is being attempted, the controller 103 checks whether a lock function has been set for the selected transport stream (S603). If the lock function is set, the controller 103 determines whether a currently input password coincides with the correspondingly stored password (S604). If a password match is determined, the controller 103 reproduces the stored transport stream in its entirety (S605). Meanwhile, if it is determined in the step S602 that the user is not attempting a full reproduction, the controller 103 consecutively reproduces the data of the stored transport stream while excluding the blocked section or sections according to the set information of the blocking flags (S606).

By adopting the broadcast signal processing method of the present invention, specific portions within one transport stream may be edited out (blocked from viewing) while being continuously reproduced according to a user preference, or through a simple confirmation process, an original transport stream can be entirely reproduced without editing, thereby providing a more convenient user interface. In addition, a lock function can be set with a stored transport stream, so that a transport stream can be reproduced in full or in part according to a user preference.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A television receiver, comprising:
   a decoder which decodes a signal constructed as a transport stream, the transport stream comprising units of packets, and each packet comprising a payload and its header;
   a flag setting unit which sets a blocking flag, which identifies start and end points of a contiguous section to be blocked during reproduction of the decoded transport stream, in each header of at least two packets;
   a signal input unit comprising a blocking flag setting button, which generates, according to user manipulation, command signals for setting the blocking flag from the start point to the end point by pressing of the blocking flag setting button once and again; and
   a controller which outputs control signals to the flag setting unit according to the command signals, to set the blocking flag.

2. The television receiver of claim 1, wherein the flag setting unit sets the blocking flag in each reserved field of the each header of the at least two packets corresponding to the start point and the end point.

3. The television receiver of claim 1, further comprising a storage medium to store the decoded transport stream in which the blocking flag is set.

4. The television receiver of claim 3, wherein the storage medium comprises a hard disc provided externally with respect to the television receiver.

5. The television receiver of claim 1, wherein the signal input unit generates a command signal for initiating setting of the blocking flag in the at least two packets corresponding to the contiguous section by the pressing of the blocking flag setting button once, and then generates a command signal for terminating the setting of the blocking flag by the pressing of the blocking flag setting button once again.

6. The television receiver of claim 1, wherein the controller blocks display of the contiguous section including the at least two packets in which the blocking flag is set during reproduction of the decoded transport stream.

7. The television receiver of claim 1, wherein the flag setting unit sets a first predetermined digital value as the blocking flag in the each header of the at least two packets corresponding to the contiguous section, wherein the first predetermined digital value is different from a second predetermined digital value set in each header of packets to be reproduced.

8. The television receiver of claim 7, wherein the first and second digital values are at least one bit respectively.

9. The television receiver of claim 1, wherein the blocking flag determines whether to reproduce data of each payload of the at least two packets corresponding to the contiguous section.

10. The television receiver of claim 1, further comprising an encoder to convert a received broadcast signal into the signal constructed as the transport stream, and to output either of the received broadcast signal and the signal converted from the received broadcast signal to the decoder.

11. The television receiver of claim 1, wherein the at least two packets corresponding to the contiguous section occurring between the start and end points are ignored during reproduction of the decoded transport stream.

12. The television receiver of claim 1, wherein the signal input unit further comprises at least one button for setting a password to release a lock function for managing reproduction options including a full reproduction and a restricted reproduction of the decoded transport stream, wherein the restricted reproduction is performed to block a viewing of the contiguous section during reproduction of the decoded transport stream when the lock function is set.

13. The television receiver of claim 1, wherein the signal input unit comprises one of a remote controller for remotely controlling the television receiver and a local keypad installed in a main unit of the television receiver.

14. A method of processing a broadcast signal in a television receiver, the method comprising:
   receiving the broadcast signal constructed as a transport stream, the transport stream comprising units of packets, and each packet comprising a payload and its header;
   decoding the broadcast signal;
   generating, according to user manipulation by pressing of a blocking flag setting button once and again, signals for identifying start and end points of a contiguous section to be blocked during reproduction of the decoded broadcast signal;
   setting a blocking flag, which determines the start and end points of the contiguous section, in each header of at least two packets corresponding to the contiguous section in response to the generated signals;
   storing the decoded broadcast signal in which the blocking flag is set; and selectively reproducing the stored broadcast signal according to reproduction options including a full reproduction and a restricted reproduction of the stored broadcast signal,
wherein the restricted reproduction is performed to block a viewing of the contiguous section during reproduction of the stored broadcast signal.

15. The method of claim 14, wherein the setting of the blocking flag comprises setting the blocking flag in each reserved field of the each header of the at least two packets.

16. The method of claim 14, further comprising setting a flag, which has a different digital value than that of the blocking flag, in each header of packets to be reproduced before or after setting the blocking flag.

17. The method of claim 14, wherein the restricted reproduction is performed not to reproduce data of each payload of the at least two packets corresponding to the contiguous section.

18. The method of claim 14, wherein the generated signals comprises first and second signals, wherein the first signal is for initiating setting of the blocking flag in the at least two packets corresponding to the contiguous section, and the second signal is for terminating the setting of the blocking flag.

19. The method of claim 14, further comprising comparing, if a password is input according to user manipulation by pressing a button, a stored password with the input password to determine whether to release the restricted reproduction.

20. The method of claim 19, wherein the restricted reproduction is performed when the compared passwords are matched, and the full reproduction is performed when the compared passwords are mismatched.

21. A method of processing a broadcast signal in a television receiver, the method comprising:
receiving, at the television receiver, a broadcast signal including a transport stream constructed using at least one packet, the transport stream of the broadcast signal being received from one of a storage medium configured to store and reproduce a decoded transport stream and a decoder configured to decode a broadcast signal currently received from a broadcasting station;
outputting the received broadcast signal using the television receiver as a currently outputted broadcast signal, the currently outputted broadcast signal including a currently decoded video signal and a currently decoded audio signal, to enable a user to reference the currently outputted broadcast signal;
setting, according to a user selection, at least one blocking flag identifying at least one contiguous section of the transport stream, the user selection of said setting being input to the television receiver during said outputting of the currently outputted broadcast signal and being input by the user referencing the currently outputted broadcast signal to make the user selection based on at least one of the currently decoded video signal and the currently decoded audio signal; and
storing in the storage medium the transport stream in which the at least one blocking flag is set,
wherein said setting of each blocking flag comprises:
sequentially generating a blocking flag start signal and a blocking flag end signal to control first and second operations of a flag setting unit, respectively, the first operation of the flag setting unit determining a start point of the at least one contiguous section of the transport stream by setting a first blocking flag in a reserved field of a packet header indicating the start point and the second operation of the flag setting unit determining an end point of the at least one contiguous section of the transport stream by setting a second blocking flag in a reserved field of a packet header indicating the end point,
wherein the at least one contiguous section of the transport stream identified by the at least one blocking flag comprises the packets of the transport stream occurring between the start and end points, and
wherein the first and second operations of the flag setting unit are respectively performed according to exactly two consecutive manipulations of one button provided to a controller of the television receiver.

* * * * *